(No Model.)

C. F. WALDRON.
ELECTRIC BATTERY.

No. 478,485. Patented July 5, 1892.

WITNESSES.
R. Henry Marsh.
Herman W. Ladd.

INVENTOR.
Charles F. Waldron
by N. H. Pierce
atty

UNITED STATES PATENT OFFICE.

CHARLES F. WALDRON, OF BOSTON, MASSACHUSETTS.

ELECTRIC BATTERY.

SPECIFICATION forming part of Letters Patent No. 478,485, dated July 5, 1892.

Application filed August 22, 1891. Serial No. 403,429. (No model.)

*To all whom it may concern:*

Be it known that I, CHARLES F. WALDRON, of Boston, in the county of Suffolk and State of Massachusetts, have invented certain new and useful Improvements in Electric Batteries, of which the following, taken in connection with the accompanying drawings, is a specification.

The object of this invention is to furnish a secondary battery of improved construction, whereby greater compactness is attained with economy of material and increase of efficiency and durability, together with an entire avoidance of danger of short-circuiting or buckling of the plates while being charged or discharged.

My battery differs in important respects from those commonly used. The plates are not suspended and an open space maintained between them, as heretofore, but are laid compactly together, alternating with rigid or semi-rigid blankets of wood, which come into immediate contact with the successive positive and negative plates, the whole forming a solid mass, pile, or stack without waste spaces between the component parts and without danger of the active material of one plate coming into contact with the opposite plate, owing to the interposed wooden blanket, which entirely covers one plate while forming a base or support for the plate above it to rest upon. With this arrangement each wooden base, with the leaden frame inclosing the active material resting upon it, constitutes a tray or complete battery element, and the active material cannot escape from such frame when horizontal even when applied in a dry or powdered state to a frame having spaces not dovetailed or especially constructed to retain it. Hence it is not necessary for me to apply such material in the form of a paste. Space is economized by bringing the terminals up through the successive plates or trays, the plates being alternately connected to and insulated from each terminal to make and prevent connection. The terminals may be each in one piece or made in sections, as explained, and each section of the terminal may be cast in one with the plate to which it is to be connected. The plates or trays being solidly packed and practically filling the box, less space is required than heretofore, a less amount of the liquid is employed, and there is no slopping of it when used on cars and other vehicles. Batteries of this construction are much stronger than any heretofore known and may be used in any position desired.

Figure 1:
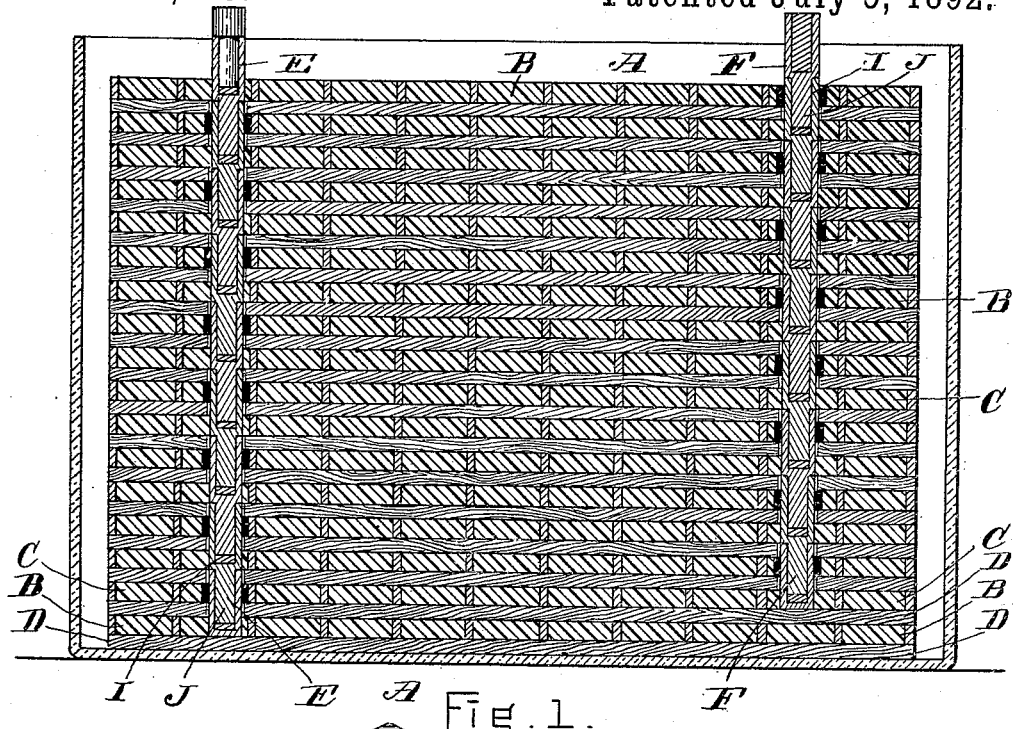
Figure 2:
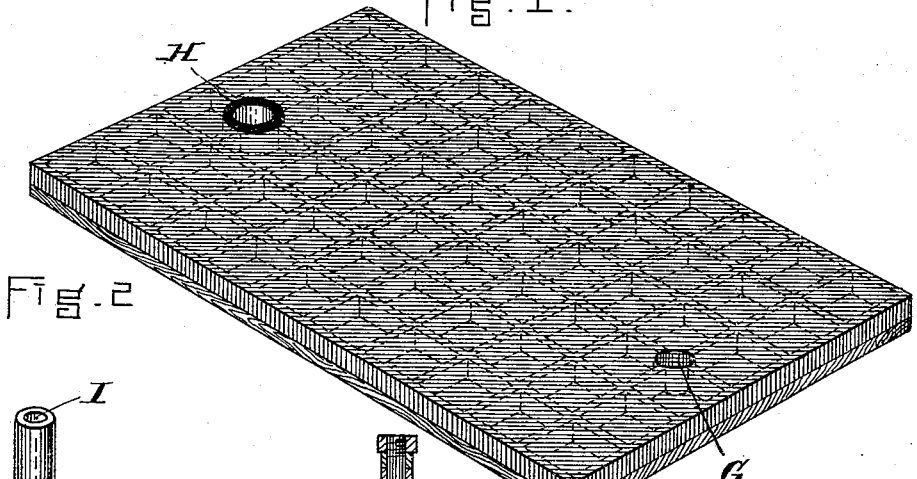
Figure 3:
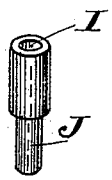
Figure 4:
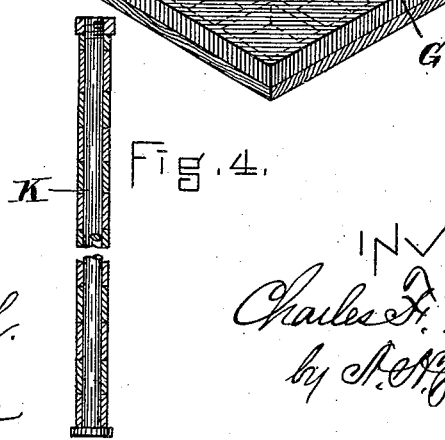

In the drawings, Figure 1 is a vertical section through my improved battery. Fig. 2 represents one of the trays formed by a battery-plate resting on its wooden base, and Fig. 3 is a detail view of one of the sections of the terminal. Fig. 4 is a modification.

A represents the box or case, in which the battery-plates B and C are shown as laid horizontally, alternating with each other and with practically rigid wooden blankets or bases D, which support each plate and lie flat upon and fully cover the surface of the preceding plate, thereby interposing a barrier between each plate and the one next beneath and above it, so that while they rest upon each other they cannot come into actual contact. Each plate, with its wooden base or support, is therefore a kind of tray forming a battery element complete in itself. The battery is thus built up in a solid mass by laying one of the wooden bases D in the bottom of the case A, then covering it with the negative plate B, the succeeding tray having the base D, upon which rests the positive plate C, and so continuing alternately until the case is filled. This compact construction is, I am aware, in opposition to the theory of electricians, which maintains an open space between the plates; but I have found my plan to work admirably in practice, whether the trays have a smooth and even surface or are grooved or purposely roughened. In either case the liquid will gain access to the surfaces of the plates and will exert its function in receiving and discharging the electrical current in a manner entirely satisfactory and with a degree of efficiency not excelled, the rigid wooden blankets or bases of the trays being more or less fully saturated.

The terminals E F are erected, respectively, upon the lowest negative and positive plate and carried thence upwardly through suitable openings G in the superposed trays or bases and plates. The several negative plates are successively soldered or otherwise electrically connected to the terminal E and insulated from the terminal F by means of rubber or packing rings H or the like. Similarly the several positive plates are connected to the terminal F and insulated from the terminal E. The terminals may be continuous metal rods or be made in separable sections. One form of sectional construction is shown in Figs. 1 and 3. Each section has an axial socket I and an axial stem J, adapted to enter the socket of the adjacent section. As thus made, the negative plates will be connected one after another to the successive sections of the terminal E, while the positive plates will be secured to the sections of the other terminal. A drop of quicksilver may be dropped into each socket before inserting the stem of the next section to amalgamate them together and insure electrical connection.

Instead of forming a socket and a stem on each section they may all be tubular and fitted alternately upon continuous rods K, rising from the respective lower plates and each forming a stem for the series of tubular sections upon it, as indicated in Fig. 4. In either case each section may be cast in one with the plate to which it appertains, and thereby be permanently connected thereto without soldering.

I claim as my invention—

1. A battery element consisting of a wooden base or blanket of a practically rigid character and a metallic plate presenting a surface of active material in immediate contact with said base or blanket, said parts together constituting a horizontal tray and remaining in permanent contact without intermediate spacing, substantially as set forth.

2. In an electrical battery, the receptacle A, the series of trays B D C D, each of substantially the same area as the interior of the receptacle and having openings G for the passage of the terminals E F, such terminals being formed in sections amalgamated together, combined with said plates and secured alternately thereto, substantially as set forth.

In testimony whereof I have signed my name to this specification, in the presence of two subscribing witnesses, on this 11th day of August, A. D. 1891.

CHARLES F. WALDRON.

Witnesses:
A. H. SPENCER,
F. V. WALDRON.